United States Patent
C S

(10) Patent No.: US 7,292,541 B1
(45) Date of Patent: Nov. 6, 2007

(54) METHODS AND SYSTEMS FOR UNNUMBERED NETWORK LINK DISCOVERY

(75) Inventor: Raja Shekar C S, Bangalore (IN)

(73) Assignee: Novell, Inc., Provo, UT (US)

( * ) Notice: Subject to any disclaimer, the term of this patent is extended or adjusted under 35 U.S.C. 154(b) by 841 days.

(21) Appl. No.: 10/766,715

(22) Filed: Jan. 28, 2004

(51) Int. Cl.
*H04L 12/28* (2006.01)
*G06F 15/173* (2006.01)

(52) U.S. Cl. .................................. 370/254; 709/223

(58) Field of Classification Search ............... 370/254, 370/255, 256, 257, 258; 709/223, 224
See application file for complete search history.

(56) References Cited

U.S. PATENT DOCUMENTS

| | | | |
|---|---|---|---|
| 5,185,860 A | 2/1993 | Wu | |
| 5,450,408 A | 9/1995 | Phaal | |
| 5,675,741 A | 10/1997 | Aggarwal et al. | |
| 5,684,796 A | 11/1997 | Abidi et al. | |
| 5,822,305 A | 10/1998 | Vaishnavi et al. | |
| 5,835,720 A | 11/1998 | Nelson et al. | |
| 5,854,896 A | 12/1998 | Brenner et al. | |
| 6,286,047 B1 | 9/2001 | Ramanathan et al. | |
| 6,392,558 B1 | 5/2002 | Schulmeyer et al. | |
| 6,411,997 B1 | 6/2002 | Dawes et al. | |
| 6,430,595 B1 | 8/2002 | Ferguson et al. | |
| 6,516,345 B1 | 2/2003 | Kracht | |
| 6,587,440 B1 | 7/2003 | Dawes | |
| 2003/0043820 A1* | 3/2003 | Goringe et al. ............. | 370/400 |
| 2003/0112764 A1* | 6/2003 | Gaspard et al. ............. | 370/252 |
| 2005/0102423 A1* | 5/2005 | Pelavin et al. ............... | 709/238 |

FOREIGN PATENT DOCUMENTS

EP    1 322 068 A2    6/2003

OTHER PUBLICATIONS

Website printout, Riverstone Configuration Database Support Page, http://www.riverstonenet.com/pdf/config_db.pdf, pp. 1-3 and 114-116, printed Jan. 28, 2004.
Website printout, Unicenter, Managing On-Demand Computing, *Aligning the IT Infrastructure to Support the Business*, http://www3.ca.com/Solutions/Solution.asp?id=315, printed Jan. 27, 2004.

(Continued)

*Primary Examiner*—Hassan Kizou
*Assistant Examiner*—Betty E. Lee
(74) *Attorney, Agent, or Firm*—King & Schickli, PLLC

(57) ABSTRACT

Embodiments of the present invention relate to methods and systems for automatically determining the network topology of a computer network containing unnumbered or unaddressed links between network devices, such as routers. The method according to one embodiment uses the network management information data available with each router. From the information, the embodiment can determine all routers connected to a given unnumbered interface. The embodiment can also automatically determine which of these routers is the immediate neighbor by comparing how they connect (via interface number) to the unnumbered interface and how they connect to each other. If the immediate neighbor is found to have a route back to the examined router or a default route, a link between the immediate neighbor and the unnumbered interface can then be stored and identified in the network topology. The method can be repeated in cycles to determine topology changes.

16 Claims, 8 Drawing Sheets

OTHER PUBLICATIONS

Website printout, hp OpenView, http://www.openview.hp.com/, printed Jan. 27, 2004.

Website printout, IBM Tivoli NetView, http://www-306.ibm.com/software/Tivoli/products/netview/, printed Jan. 27, 2004.

Website printout, Understanding and Configuring the ip unnumbered Command, http://www.cisco.com/warp/public/701/20.html, printed Jan. 27, 2004.

Website printout, Payam Kahen, IP Unnumbered between Cisco and RS, http://www.riverstonenet.com/support/configdb/0034.html, Jul. 29, 2001, printed Jan. 27, 2004.

Website printout, Eric A. Pulsipher, NNM 5.0: netmon Internals For New Features, http://support.openview.hp.com/pdf/dev_ov_netmon97.pdf , printed Jan. 27, 2004, pp. 1-14.

Website printout, IP Configuration Decisions, http://www.novell.com/documentation/lg/nw5/uscomm/rtcf_enu/data/hmjqkeoe.html, printed Jan. 28, 2004.

Website printout, Understanding Network Discovery, http://www.novell.com/documentation/lg/zfsi/zfs_admin/data/a4ziolu.html, printed Jan. 26, 2004.

Breitbart, Yuri, Minos Garofalakis, Ben Jai, Cliff Martin, Rajeev Rastogi, and Avi Silberschatz, *Topology Discovery in Heterogeneous IP Networks: The NetInventory System*.

Stevens, Sandy, ZENworks for Networks, *Delivering Quality of Service to Network Customers*, NetWare Connection, May 2000.

Nortel Networks, *Configuring IP, ARP, RARP, RIP, and OSPF Services,* BayRS Version 15.1, Part No. 308627-15.1 Rev 00, Oct. 2001, pp. i-xxii, 1-1, 1-15, 1-20, and 3-50 to 3-71.

Breibart, Yuri, Minos Garofalakis, Ben Jai, Cliff Martin, Rajeev Rastogi, and Avi Silberschatz, *Topology Discovery in Heterogeneous IP Networks: The NetInventory System*, 2000.

Waddington et al. Topology Discovery for Public IPv6 Networks. ACM SIGCCMM Computer Comm. Review. vol. 32, No. 3, Jul. 2003. pp. 59-68.

YAO et al. Topology Inference in the Presence of Anonymous Routers. IEEE Infocom 2003, 22nd Annual Joint Conference of the IEEE Computer and Communications Societies.(IEEE CAT No. 03CH37428) IEEE Piscataway, NJ USA. vol. 1, Mar. 30, 2003. pp. 353-363.

Hwa Chun Lin et al. An Algorithm for Automatic Topology Discovery of IP Networks. COMMUNICATIONS 1998. ICC 98 Conference on Atlanta, GA USA. Jun. 7-11, 1998. vol. 2. pp. 1192-1196.

\* cited by examiner

METHODS AND SYSTEMS FOR UNNUMBERED NETWORK LINK DISCOVERY

TECHNICAL FIELD

Embodiments of the present invention relate generally to methods and systems for accurately identifying the topology of a network, and, in particular, to methods and systems for discovery of unnumbered network links.

BACKGROUND

An internetwork of computers typically consists of a geographically distributed collection of interconnected network segments which are connected using routing devices such as routers. A network segment can be a local area network (LAN) or a wide area network (WAN). A LAN is a network of computers in close proximity, such as a network at one corporate office. The various LANs can then be connected together by point-to-point links that form a WAN, such as a WAN connecting all the various different locations of the offices of a company. These numerous LAN and WAN segments connected by routers form a relatively complex topology of the network. Because of such complex topologies of corporate networks, it becomes highly important to accurately monitor the network to ensure proper operation, and to quickly and accurately detect and correct faults in the network.

Network management software provides the ability to control and monitor devices on a computer network from a central location. A managed device can be any type of node residing on a network, such as a computer, printer or router. Simple Network Management Protocol (SNMP) (a part of the TCP/IP protocol suite) is the protocol typically used for the management related communication between the network management software application and the managed devices.

As networks are constantly being modified and expanded with new users, services, and applications, such network management software is a vital tool for a network manager to keep track of the network resources and to allocate the network bandwidth in the most efficient manner. These tools, such as Novell's ZENworks® for example, allow the network manager to allocate bandwidth between users, locations, and applications, and to generally manage network traffic. Typical monitoring services provided by such software include the ability to monitor bandwidth consumption, connection time, response time, and connection failures. Using the software, policy rules can then be defined for the network in order to optimize traffic, and, specifically, the users, services, and times to which the rules apply can also be defined. Moreover, the software can enable the configuration and remote management of routers and switches, as well as other network devices. Accordingly network management systems typically provide functions for fault management (for detecting and notifying the network manager when a failure occurs in network hardware or software), configuration management (for remotely configuring the network devices), accounting (for logging usage of network resources), performance management (for monitoring the performance of the network and the network devices), and network security (for detecting and notifying the network manager of potential misuse of network resources).

Typical network management software also automatically discovers the topology of the network and depicts it in the form of a map. More specifically, typical network management software scans configuration data for the network devices, such as is available in route tables and/or interface lists, in order to discover the arrangement of the devices in the network and the connections between those devices. These devices can include computers, printers, hubs, switches, and routers, and the connections can include network nodes or links between devices. Accurate knowledge of the network topology is important to proper management of the network as well as prediction of the performance of the network. For example, the network management application needs to know the configuration and links in the network in order to manage the network resources, such as shared software application resources and other resources such as memory and printing resources. This knowledge can also help to predict where network traffic may be high, and to plan resources accordingly. Moreover, this knowledge can be helpful in determining the cause and location of faults that may occur on the network.

Because of the complexity of most networks, manual discovery of the network topology for network management purposes would be burdensome and time consuming. Accordingly, automated systems have been developed for network topology discovery utilizing information regarding the various network addresses of the devices in the network. In particular, every device on the network is usually identified by a unique address. If Internet Protocol is used, this address is called the Internet Address (or an IP address). An IP address consists of a network id and a host id. The network id represents the LAN or the WAN segment to which the device belongs. A typical network management application uses the network address of each network segment connected to a router to discover and depict the topology of the network. Such systems have had the capability of identifying the addresses of the various devices on the network as well as the addresses of the interfaces of a given device linking it to other devices in the network. Thus, by automatically identifying the network addresses of the devices, interfaces and links, the topology of the network can be known.

A typical automated topology discovery method would create a network segment S for each interface of a router, the network segment being identified by the network number N of the router interface. Other computers are then said to belong to the network segment S if they have an address belonging to the same network number N as the router interface. Then, if router B contains an address belonging to the same network number N, router B is added to segment S and other segments that belong to B are linked to S through router B.

Previously, the interfaces of a device have been assigned addresses. For instance, each port on a router can be assigned a network address which identifies it. However, recently, a feature has been provided on devices such as routers and servers which allow no address to be assigned or defined for a point-to-point interface (e.g., a communication interface connecting two networks, such as two LAN's of a company in different cities). This feature was intended to counter the scarcity of addresses, as more and more addresses are being used due to the increase in the number of networked devices. In particular, point-to-point traffic flows only to a single destination or peer, and is therefore not being routed to any other destination. Therefore, assigning a unique address to that interface wastes addresses within the address pool allocated for the network. Such interfaces are called unnumbered interfaces and the point-to-point links between two router interferes are called unnumbered links.

Unnumbered links can be configured on PPP, frame relay, and X.25 interface types, for example.

Such unnumbered or unaddressed links and interfaces pose a problem to automated network address based topology discovery methods used by network management software applications. In particular, all unnumbered interfaces use a default network address, such as 0.0.0.0. Accordingly, typical automated network discovery methods would fail to distinguish one unnumbered interface of a router from another unnumbered interface, and would fail to properly assign devices to the proper segment or router link. Therefore, accurate information cannot be obtained regarding the network topology.

While other attempts to identify unnumbered interfaces have involved use of the address of the next hop router in the route table, such methods are likewise often not accurate. In particular, many routers from popular vendors like Cisco and Nortel assign a value of 0.0.0.0 to the address of the next hop router (the ipRouteNextHop if SNMP protocol is utilized). Therefore, use of these methods can fail to identify a distinct and meaningful value for an unnumbered interface of a router. Moreover, many discovery methods can also fail to accurately handle changes in the network topology, such as when an unnumbered link fails.

Accordingly, methods and systems for automatically and accurately identifying unnumbered network links are desired.

SUMMARY OF THE INVENTION

In one embodiment, a method is provided for discovery of network topology in networks having network routers with unnumbered interfaces. The method comprises obtaining the configuration of all routers in the network, and, for a particular router, identifying an unnumbered interface. The method further comprises, for the unnumbered interface of a particular router, identifying connected routers on the destination networks reachable through the unnumbered interface and adding those connected routers to a connected router list for the unnumbered interface. For the connected routers in the connected router list, the method further comprises determining which of the connected routers is an immediate neighbor to the particular router having the unnumbered interface. In addition, the method comprises determining the connected interface of the immediate neighbor which connects to the unnumbered interface of the particular router, and identifying an unnumbered link between the unnumbered interface and the connected interface. The determination of the immediate neighbor can be conducted by determining whether the connected router connects to the unnumbered interface and to all other connected routers over different interfaces.

According to another embodiment, a method is provided for automated discovery of network topology in networks having network routing devices with unnumbered interfaces. The method comprises, for a routing device in a network, identifying an unnumbered interface of the routing device. The method also comprises identifying connected routing devices connected to the unnumbered interface, and determining which of the connected routing devices is an immediate neighbor to the routing device having the unnumbered interface. In addition, the method comprises identifying an unnumbered link between the unnumbered interface and the corresponding interface of the immediate neighbor, and indicating the unnumbered link in network topology data. The determining operation can utilize values in a route table for each connected router, and the values can comprise the interface index and the route destination.

In accordance with another embodiment, a method is provided for automated discovery of network topology in networks having network routing devices with unnumbered links. The method comprises identifying an unnumbered interface of a routing device in a network, using route data to identify connected routing devices connected to the unnumbered interface, and, for every connected routing device, comparing the interface connections of the connected routing device. The method further comprises using the comparisons to identify an unnumbered link between the unnumbered interface and a corresponding interface of one of the connected routing devices.

According to another embodiment, a computer implemented method is provided for automated discovery of network topology in networks having network routing devices with unnumbered links. The method utilizes executable instructions and comprises identifying an unnumbered interface of a routing device in a network, determining the immediate neighbor to the unnumbered interface using route table data of the routing device and other routing devices in the network, and identifying an unnumbered link between the unnumbered interface and a corresponding interface of the immediate neighbor. The method can further comprise, in some embodiments, using route table data to confirm that the immediate neighbor has a network route or a default route to the unnumbered interface over the corresponding interface, storing the unnumbered link in a topology database indicative of the network topology, and repeating the method in periodic cycles such that changes in topology are detected and identified.

In accordance with another embodiment, a computer network is provided, comprising at least two network devices connected to one another, one device having an unnumbered interface connected to an unnumbered interface of the other device thereby defining a link that is unnumbered. The network further comprises network management information data indicating the interface assignments of the two network devices, and a network management system configured to access the network management information data, to confirm that the network devices are immediate neighbors and connected to one another via unnumbered interfaces, to assign an identifier of the unnumbered link, and to present that identifier in network topology data. In some embodiments, the network can further comprise three or more network devices, and the network management system can be configured to determine the connection of the unnumbered interfaces by comparing the interface connections of the network devices.

In another embodiment, a computer readable medium is provided having stored thereon data structures for use in automated discovery of unnumbered links in a network topology. The data structures comprise an interface data structure representing an interface of a first routing device, a connected router data structure identifying other routing devices reachable over an interface of the first routing device, and an unnumbered connectivity data structure identifying an unnumbered link between an interface of the first routing device and an interface of another routing device identified in the connected router data structure.

Various aspects of the present invention will become apparent to those skilled in this art from the following description wherein there is shown and described embodiments of the invention, simply for the purposes of illustration. As will be realized, other different aspects and embodiments can be provided without departing from the scope of the invention. Accordingly, the drawings and descriptions herein are illustrative in nature and not restrictive in nature.

BRIEF DESCRIPTION OF THE DRAWINGS

The accompanying drawings, incorporated in and forming part of the specification, depict several illustrative embodiments, which, together with their descriptions, serve to explain principles of the present inventions. In the drawings:

FIG. 3 is a flow diagram illustrating another example of a method that operates for discovery of unnumbered links in a network, according to principles of the present invention;

DETAILED DESCRIPTION OF EXAMPLE EMBODIMENTS

Generally, one embodiment of the present invention relates to a method and system for automatically determining the network topology of a computer network containing unnumbered or unaddressed links between the routers. An unnumbered link is a point-to-point link between two router interfaces which have no addresses bound to them. The method according to one embodiment uses the network management information data available with each such router. After discovering router configuration and identifying all unnumbered interfaces, the destination routes for each unnumbered interface are used to identify unnumbered links. In particular, for an unnumbered interface, the method of this embodiment uses values in the router tables indicating the destination routers for that unnumbered interface as well as how those destination routers connect together and to the unnumbered interface. From the information, the method can determine all routers connected to a given unnumbered interface. Then, the method can automatically determine which of these routers is the immediate neighbor by comparing how they connect (via interface number) to the unnumbered interface and how they connect to each other. Once the immediate neighbor is known, the link between the immediate neighbor and the unnumbered interface can then be identified in the network topology.

Figure 1:
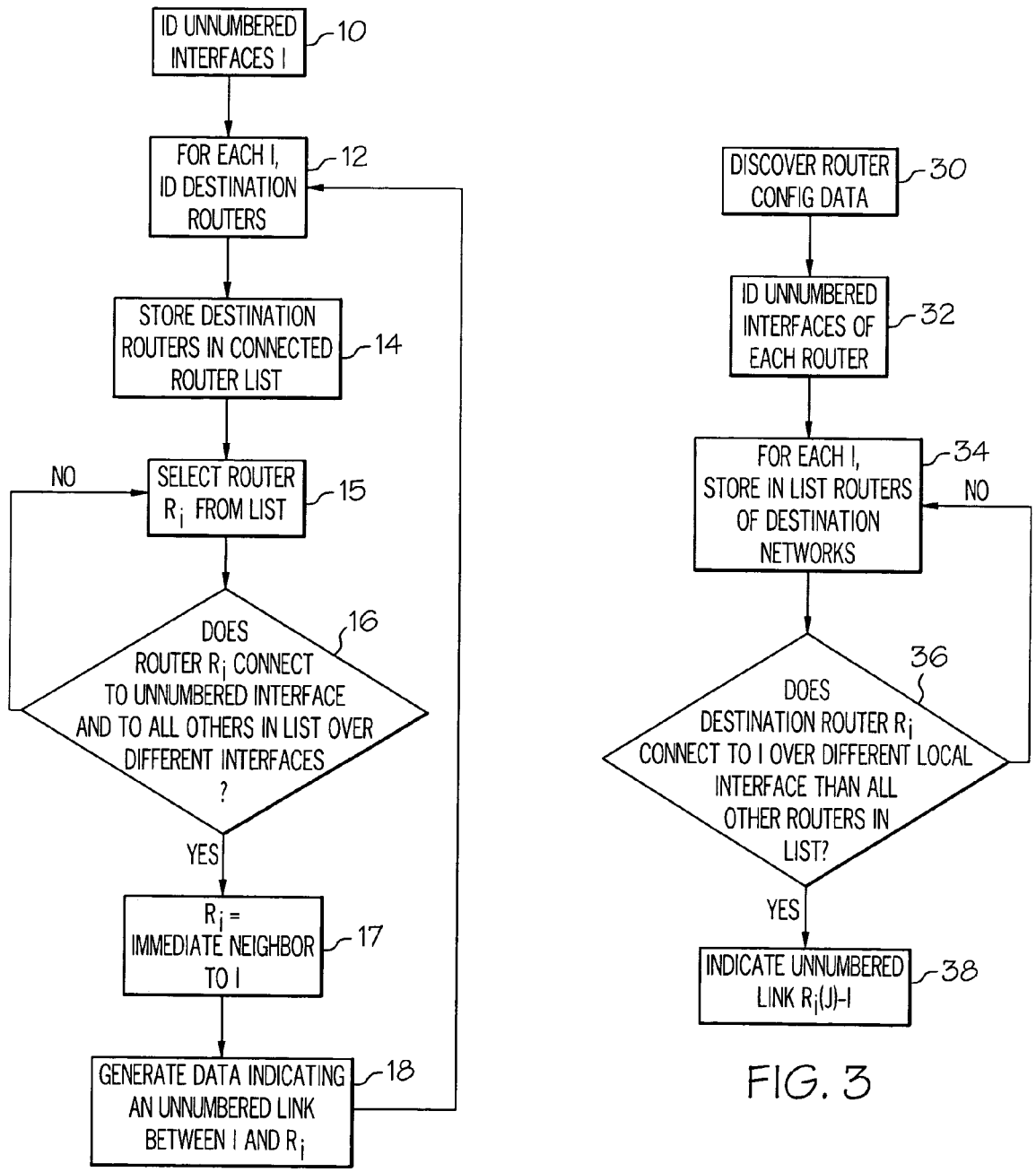
FIG. 1 is a flow diagram illustrating a method that operates to discover unnumbered router links, according to principles of the present invention.

FIG. 1 is a flow diagram of an illustrative method of unnumbered link discovery, operating according to principles of the present invention. First, as shown in block 10, the unnumbered interfaces of a router are identified. Then, as shown in block 12, for each unnumbered interface, the routes to all destination networks over this particular interface are identified (i.e., it is determined which other routers can be reached from this interface, either directly or through additional routers). For these destination networks, all routers on the destination networks are then placed into a connected router list, as shown in block 14. Then, as shown in blocks 15-16, the routers in the connected router list are examined, and it is determined which of these routers has the property of having a route to the router being examined and having routes to all other routers in the connected router list over two different interfaces. This property is thus used to identify the immediate neighbor to the router being examined, (i.e., the router at the other end of the unnumbered link), as shown at block 17. If the immediate neighbor is thus found to have a route back to the examined router or a default route, an unnumbered link is created between the examined router and the immediate neighbor, as shown at block 18.

Changes in network connectivity typically occur frequently, as devices are added and removed from the network, as network connections fail or otherwise become unavailable, or as network connections are modified. To detect such changes in the topology, the method of this embodiment of FIG. 1 can be repeated in cycles. In each cycle, the discovered connectivity can be stored. In the subsequent cycle, if there is a change in topology (e.g., an unnumbered link is down), the route table of routers will also have changed. The new route table information can then be used to identify the new topology and delete the unnumbered links that are down.

Figure 2:
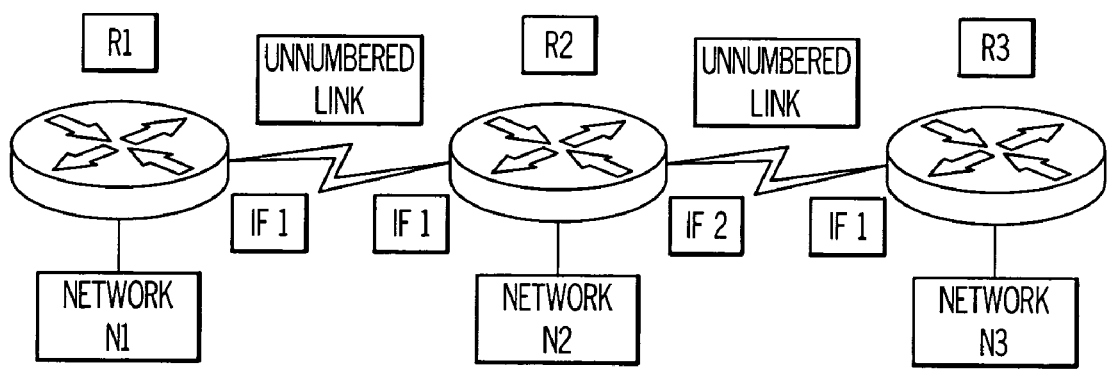
FIG. 2 is a schematic diagram illustrating an example of connected routers having unnumbered point-to-point links which can be discovered by the illustrative methods and systems described herein.

FIG. 2 illustrates an example of connected routers having unnumbered point-to-point links which can be discovered by the illustrative embodiments described herein. In FIG. 2, unnumbered interface If1 on router R1 is connected only to R2 and R3. These two routers would be thus placed in a connected router list, or otherwise stored or noted. Therefore, one of R2 or R3 must be the immediate neighbor to interface If1 of router R1.

In particular, in the example of FIG. 2, router R3 contains a route to R1 (the examined router) and R2 (the other router in the connected router list), but over the same interface If1 (i.e., R3 has the same relative communication perspective with respect to R2 and R1, such that, to communicate a signal to R2 and R1, R3 would send the signal from the same interface If1). Therefore, R3 cannot be situated in between R1 and R2 and is not an immediate neighbor to interface If1 of R1. In contrast, R2 contains a route to R1 over If1 and a route to R3 over If2. Therefore, R2 is identified to be in between R1 and R3 because it is connected to them over two different R2 interfaces.

Thus, in this embodiment and in accordance with principles of the present invention, the routers connected to the unnumbered interface of the examined router are identified, and it is determined how these connected routers are connected to each other. In particular, the connected router which is connected to the examined router and every other router in the connected router list over two different interfaces is identified. This technique can also be used when there are more than two routers in the connected router list. For example, if R3 in FIG. 2 has an unnumbered link to an additional router R4, then interface If1 on router R1 would be connected to R2, R3 and R4. So, one of R2, R3 or R4 must be the immediate neighbor. This can be determined according to principles of the present invention by examining each of the interfaces of R2, R3, and R4 and how they connect to the other routers. In particular, it can be determined that R3 is situated in between R1 and R4 (i.e., it is connected to R1 and R4 on different R3 interfaces) but that R1 and R2 are on the same side of R3 (i.e., both R1 and R2 connect to the same R3 interface). However, R2 is found to be situated in between R1 and R3 and also between R1 and R4, because it connects to R1 on one of its (R2's) interface and, on a separate R2 interface, to all of the other destination routers of the unnumbered interface (of R1) being examined. So, R2 is the immediate neighbor.

FIG. 3 is a flow diagram illustrating another example of a method for discovery of unnumbered interfaces in a network, according to principles of the present invention. This illustrative method operates as follows. As shown in block 30, the configuration of all the routers in the network is first discovered by accessing configuration data for the routers. In one embodiment, this configuration information can be obtained from configuration data in the following MIB-2 groups or tables, although it is to be understood that other network management data may be utilized in other embodiments—

| | |
|---|---|
| system group | contains the system name etc. |
| ifTable | contains Interface info |
| ipAddrTable | contains IP address to interface binding info |
| ipRouteTable | contains route information |

Then, for each discovered router R from block 30, the unnumbered interfaces of that router are identified. In particular, the operational PPP, Frame Relay or X.25 interfaces with no IP address bound to them are identified, as shown in block 32. Then, as shown in block 34, for each such unnumbered interface I, and for every network route over I found in the route table, the routers on the destination network are found and added to a list (connected router list) or otherwise stored. Accordingly, at this stage, the connected router list for each unnumbered interface contains routers which are reachable through this interface. Then, as shown at block 36, for each discovered router R, and for each unnumbered interface I of R, and for every router $R_i$ in the connected router list of the unnumbered interface I, and for every $R_j$ in the connected router list (other than $R_i$), an interface comparison operation can be conducted, in order to determine if $R_i$ is an immediate neighbor to R. This can be conducted by the following illustrative software condition operation, for example:

If isintermediateRouter($R_i$, R, $R_j$)=TRUE for all $R_j$, Then $R_i$ is the immediate neighbor The operation "isIntermediateRouter" checks if router $R_i$ is in between R and $R_j$ and can be defined as follows, for example—

```
isIntermediateRouter(R_i, R, R_j)
{
    The route searched can be a network route or a default route.
    If R_i has route to R over interface X and a route to R_j also over
    interface X
        Return FALSE;
    Else
        Return TRUE;
}
```

Finally, as shown in block 38, if $R_i$ is an immediate neighbor, and if $R_i$ also has a route back to R through an unnumbered interface J (route to one of R's networks or a default route), an unnumbered link is identified between R's interface I and $R_i$'s interface J.

As can be understood, the data needed for embodiments such as these can be accessed from one or more stored router tables for the routers analyzed. In particular, routers and other network devices typically store and maintain a routing table that contains information about destination networks that it knows of (e.g., addresses of networks or network devices that it knows it can communicate with via a specific one of its interfaces). Such tables typically include the destination numbers or addresses, as well as, for each destination, the corresponding interface number over which this network is reachable and the corresponding next-hop router address (the address of the first router on the path to that destination network). These are called "network routes". A "default route," on the other hand, is a special entry in a route table. In embodiments where IP addresses are used, it will have the destination network number as 0.0.0.0, all other information being like a network route. For a default route, when a signal, such as a packet or other data, has to be sent to a remote machine, the router will first attempt to see if it has a network route to the remote machine's network number. If it does not find one, it uses the default route. In other words, the router sends the signal to whatever next-hop router is listed for the default route via the corresponding default interface.

Figure 4:
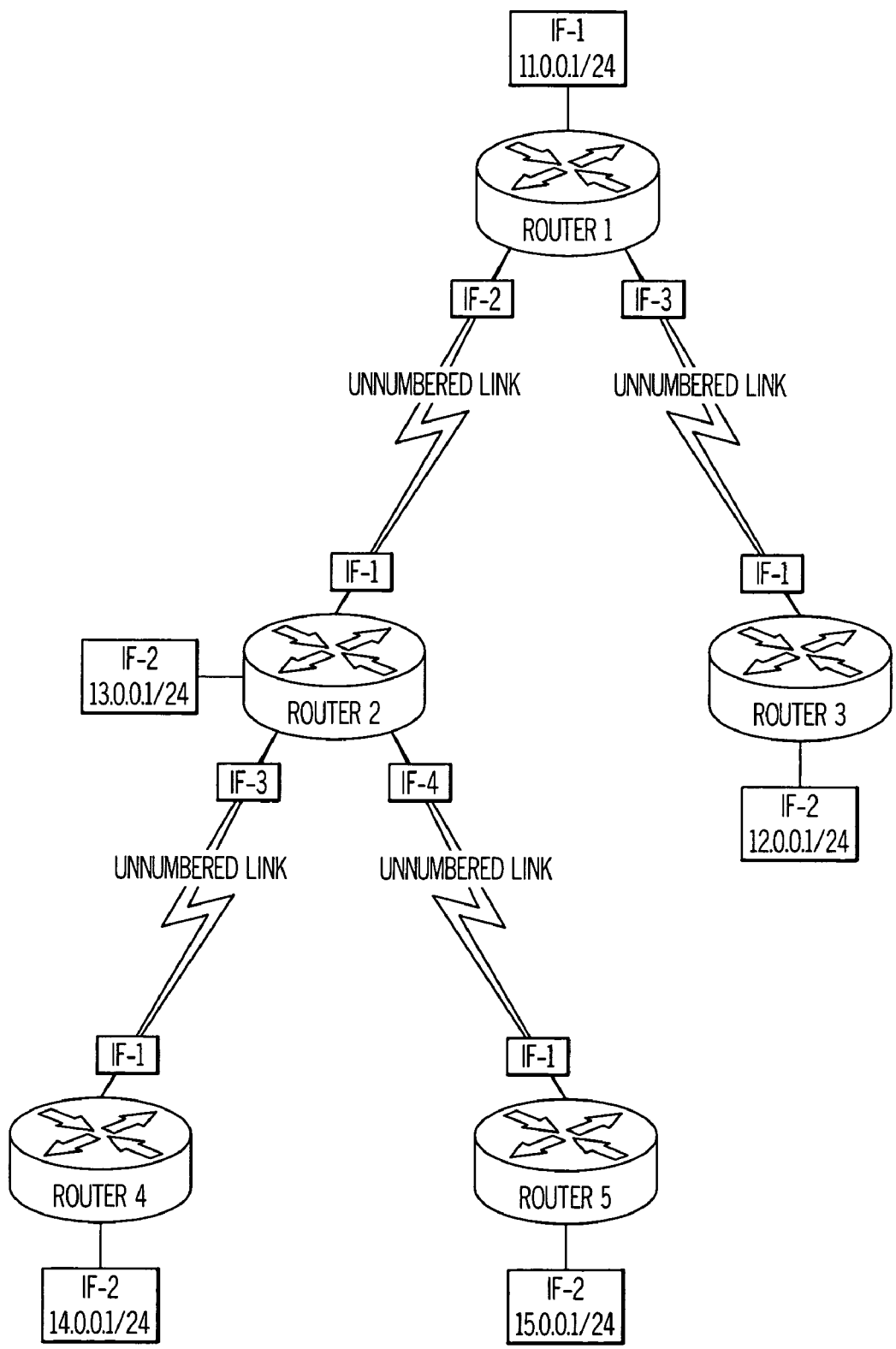
FIG. 4 is a schematic diagram illustrating another example network having unnumbered links that can be identified according to principles of the present invention.

FIG. 4 is a schematic diagram illustrating an example network portion having unnumbered interfaces that can be identified according to principles of the present invention. For the sake of simplicity, it is assumed that the example network is an isolated network with no default routes configured. Considering the particular case of interface 2 (If2) of Router 1, it can be shown how the methods described above can identify the unnumbered link to Router 2 over this interface. The routers in this example, would have the following route tables if IP addressing were utilized, although it should be understood that the inventive methods and systems can be applicable to a variety of addressing schemes and protocols. Note that there are various unnumbered links in these tables. For example, the link between router 1 and router 2 is unnumbered, as shown by the tables where the ipRouteNextHop for interface 2 of router 1 and for interface 1 of router 2 have the value of 0.0.0.0. This is also true for the other point-to-point links, such as between router 2 (interface 4) and router 5 (interface 1).

| Route Table for Router 1 | | |
|---|---|---|
| ipRouteDest | ipRouteIfIndex | ipRouteNextHop |
| 11.0.0.0 | 1 | 11.0.0.1 |
| 12.0.0.0 | 3 | 0.0.0.0 |
| 13.0.0.0 | 2 | 0.0.0.0 |
| 14.0.0.0 | 2 | 0.0.0.0 |
| 15.0.0.0 | 2 | 0.0.0.0 |

| Route Table for Router 2 | | |
| --- | --- | --- |
| ipRouteDest | ipRouteIfIndex | ipRouteNextHop |
| 11.0.0.0 | 1 | 0.0.0.0 |
| 12.0.0.0 | 1 | 0.0.0.0 |
| 13.0.0.0 | 2 | 13.0.0.1 |
| 14.0.0.0 | 3 | 0.0.0.0 |
| 15.0.0.0 | 4 | 0.0.0.0 |

| Route Table for Router 4 | | |
| --- | --- | --- |
| ipRouteDest | ipRouteIfIndex | ipRouteNextHop |
| 11.0.0.0 | 1 | 0.0.0.0 |
| 12.0.0.0 | 1 | 0.0.0.0 |
| 13.0.0.0 | 1 | 0.0.0.0 |
| 14.0.0.0 | 2 | 14.0.0.1 |
| 15.0.0.0 | 1 | 0.0.0.0 |

| Route Table for Router 5 | | |
| --- | --- | --- |
| ipRouteDest | ipRouteIfIndex | ipRouteNextHop |
| 11.0.0.0 | 1 | 0.0.0.0 |
| 12.0.0.0 | 1 | 0.0.0.0 |
| 13.0.0.0 | 1 | 0.0.0.0 |
| 14.0.0.0 | 1 | 0.0.0.0 |
| 15.0.0.0 | 2 | 15.0.0.1 |

Figure 5:
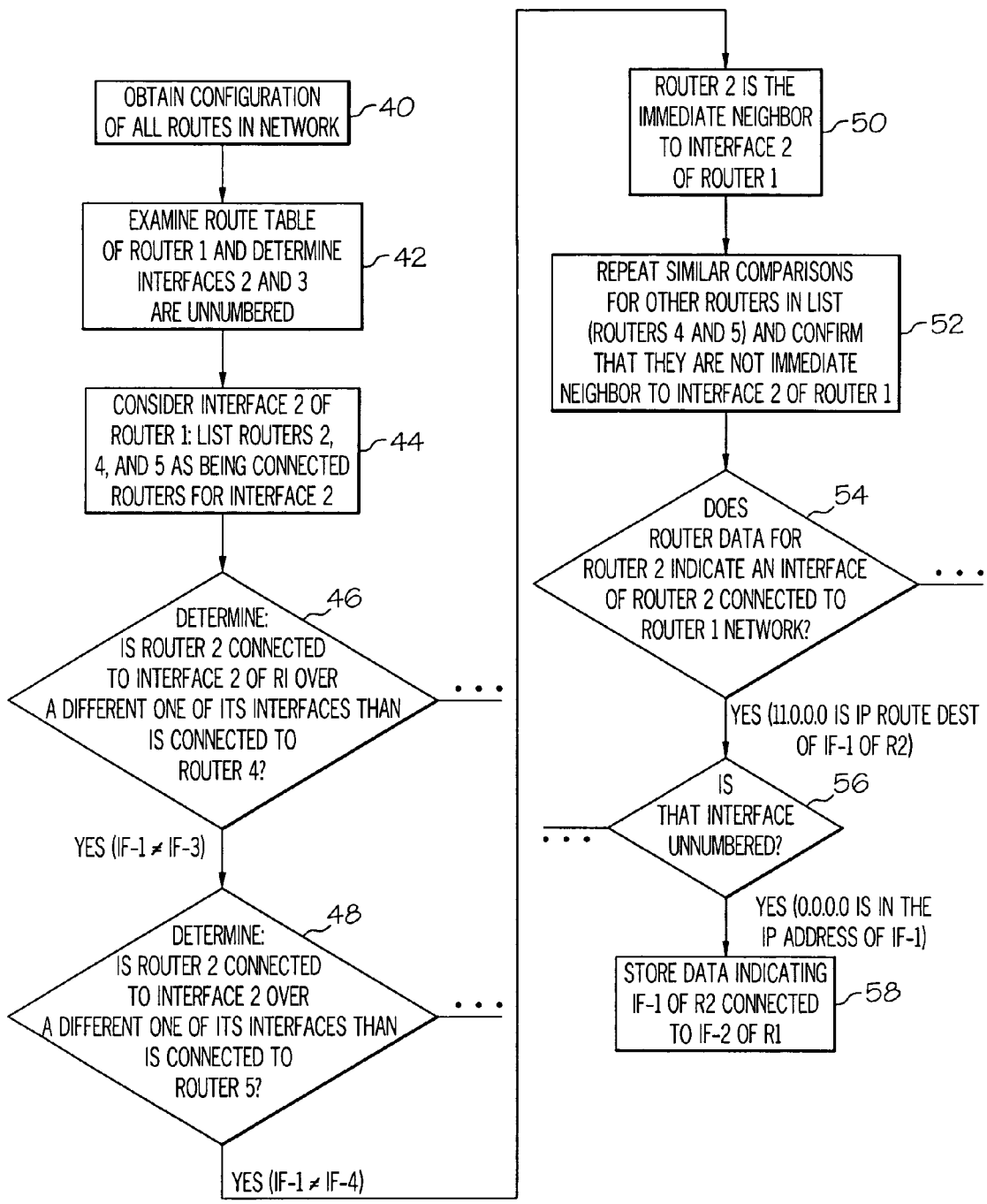
FIG. 5 is a flow diagram of an illustrative discovery process that can be utilized for unnumbered link discovery according to principles of the present invention.

FIG. 5 is a flow diagram of an illustrative process that can be utilized according to principles of the present invention, and specifically could be utilized to identify and name the unnumbered link between interface 2 of Router 1 and interface 1 of Router 2 of the example of FIG. 4 (as well as the other unnumbered links). In particular, configuration of all the routers in the network is discovered at operation block 40. Then, for each router, the unnumbered interfaces are identified (i.e., operational PPP, Frame Relay or X.25 type interfaces with no IP address bound), as shown in block 42 of FIG. 5. In this example, Router 1 will be examined in particular. Thus, interfaces 2 and 3 would be identified as unnumbered interfaces of Router 1 in block 42. Then, for unnumbered interface 2, a list is created identifying the routers on the destination network for every network route over interface 2 found in the route table. In this case, ipRouteDest 13.0.0.0, 14.0.0.0 and 15.0.0.0 exist in the route table for router 1 over interface 2. Accordingly, the connected router list would be generated to include Router 2, Router 4 and Router 5, as these are routers on networks 13.0.0.0, 14.0.0.0 and 15.0.0.0. This list creation is shown at block 44 of FIG. 5. Then, for each router in the list, the following determinations are made:

If isIntermediateRouter($R_i$, R, $R_j$)=TRUE for all $R_j$, (i.e., for all other routers in the router list).

In one such embodiment, this determination can be made by successive decision operations which are carried out to compare a) the interface that connects the particular connected router to the examined router, with b) the interface that connects the particular connected router to another connected router in the connected router list. These operations can be carried out until all comparisons have been made for the connected router against all other connected routers in the connected router list. If these interfaces prove to be different for all of the other connected routers, then $R_i$ is the immediate neighbor. So in this example, if $R_i$ is Router 2 (the first router in the connected router list generated), then $R_j$ would be Router 4 and Router 5 (the other routers in the connected router list). The first decision operation can then be conducted to compare the interface of Router 2 that is connected to Router 1 to the interface of Router 2 that is connected to Router 4. In this case, it is determined that these interfaces differ (i.e., interface 1 of Router 2 does not equal interface 3 of Router 2), as shown at block 46 of FIG. 5. Then, a successive operation can be conducted to compare the interface of Router 2 that is connected to Router 1 to the interface of Router 2 that is connected to Router 5. In this case, it is determined that these interfaces also differ (i.e., interface 1 of Router 2 does not equal interface 4 of Router 2), as shown at block 48 of FIG. 5. These operations can be expressed by the following illustrative condition operations:

is IntermediateRouter(Router 2,Router 1 Router 4)=TRUE is IntermediateRouter(Router 2,Router 1 Router 5)=TRUE Thus, because both of these conditions are true, Router 2 is the immediate neighbor, as shown at block 50.

The same decision functions can be carried out for the interfaces of each other router in the connected router list (i.e., for routers 4 and 5). Thus, Ri would then be set to Router 4 to examine that router, and $R_j$ can be set to Router 2 and Router 5 (the other two routers in the connected router list. In this case:

is IntermediateRouter(Router 4,Router 1 Router 2)=FALSE is IntermediateRouter(Router 4,Router 1 Router 5)=FALSE Thus Router 4 is NOT the immediate neighbor.

Similarly when Ri is Router 5, then $R_j$ is Router 2 and Router 4 and:

is IntermediateRouter(Router 5, Router 1 Router 2)=FALSE is IntermediateRouter(Router 5, Router 1 Router 4)=FALSE Thus Router 5 is also NOT the immediate neighbor.

These operations are shown in block 52 of FIG. 5.

Finally, in this embodiment, it is confirmed if $R_i$ has an unnumbered route back to R over interface J. This can be conducted by checking the route table of $R_i$ to confirm that $R_i$ has a corresponding route to one of R's networks or a default route, and that interface J of $R_i$ is an unnumbered interface. Then, an unnumbered link is identified between R's interface I and $R_i$'s interface J by storing data indicative of this link or by otherwise assigning an identifier or address for this link. In this example, Router 2 is identified as the immediate neighbor. Analyzing the router data for Router 2, it is confirmed that Router 2 has a route to Router 1 over interface 1 (i.e., Router 1's network 11.0.0.0 is the ipRouteDest of interface 1 of router 2), and that this interface 1 of router 2 is an unnumbered interface (i.e., interface 1 of router 2 has an IP address of 0.0.0.0 in the ipAddrTable), as shown at blocks 54 and 56. Therefore, data is stored to indicate that an unnumbered link exists between Router 1's interface 2 (the router and the interface that were being examined) and Router 2's interface 1, as shown at block 58. This can be achieved, for example by storing an indication or data such as the following:

[Router 1-Interface 2] connected to [Router 2-Interface 1]

This indication can then be displayed to the network manager on the network topology display screen or report, to indicate to the manager that this link, which was previously unidentifiable, in fact exists.

The following describes examples of data structures that can be utilized with one or more of these example methods and systems described herein.

In particular, the following router structure can be used to store the information of a router. This information can also be used in the subsequent cycles of discovery to detect changes.

```
Router
{
    default_router_ip;
    interface_count;
    Interface        *interface_list
    Router           *next_router;
    ...
    found_in_this_cycle;
    snmp_route       *route_list;
}
```

A list of all the routers can then be pointed to by:

Router*Router_List;

Moreover, the following structure can be used to represent one interface of the router. This structure can be made part of the Router structure described above. It represents one interface of the router.

```
Interface
{
    if_index;
    if_type;
    ip_address;
    ip_mask;
    operational_status;
    Interface        *next_interface;
    Router           *parent_router;
    ...
    if_route         *if_route_list;
    connected_router *connected_router_list;
}
```

Additionally, a data structure called "snmp_route" can be defined to represent one route known to a router, such as per the following:

```
snmp_route
{
    ip_route_dest;
    ip_route_type;
    ip_route_if_index;
    snmp_route       *next_route;
}
```

Another structure, the if_route structure, can be created to represent a route over a particular interface. An entry of this type can be added to Interface.if_route_list if the Interface is found to be an unnumbered interface:

```
if_route
{
    ip_route_dest;
    if_route *next_route;
}
```

Additionally, a structure called connected_router can be defined to represent a router which is reachable over a particular interface. An entry of this type can be added to Interface.conn_router_list if the Interface is found to be an unnumbered interface and it has a route to one of the networks of this router:

```
connected_router {
    Router           *router_ptr;
    connected_router *next_router;
}
```

Figure 6:
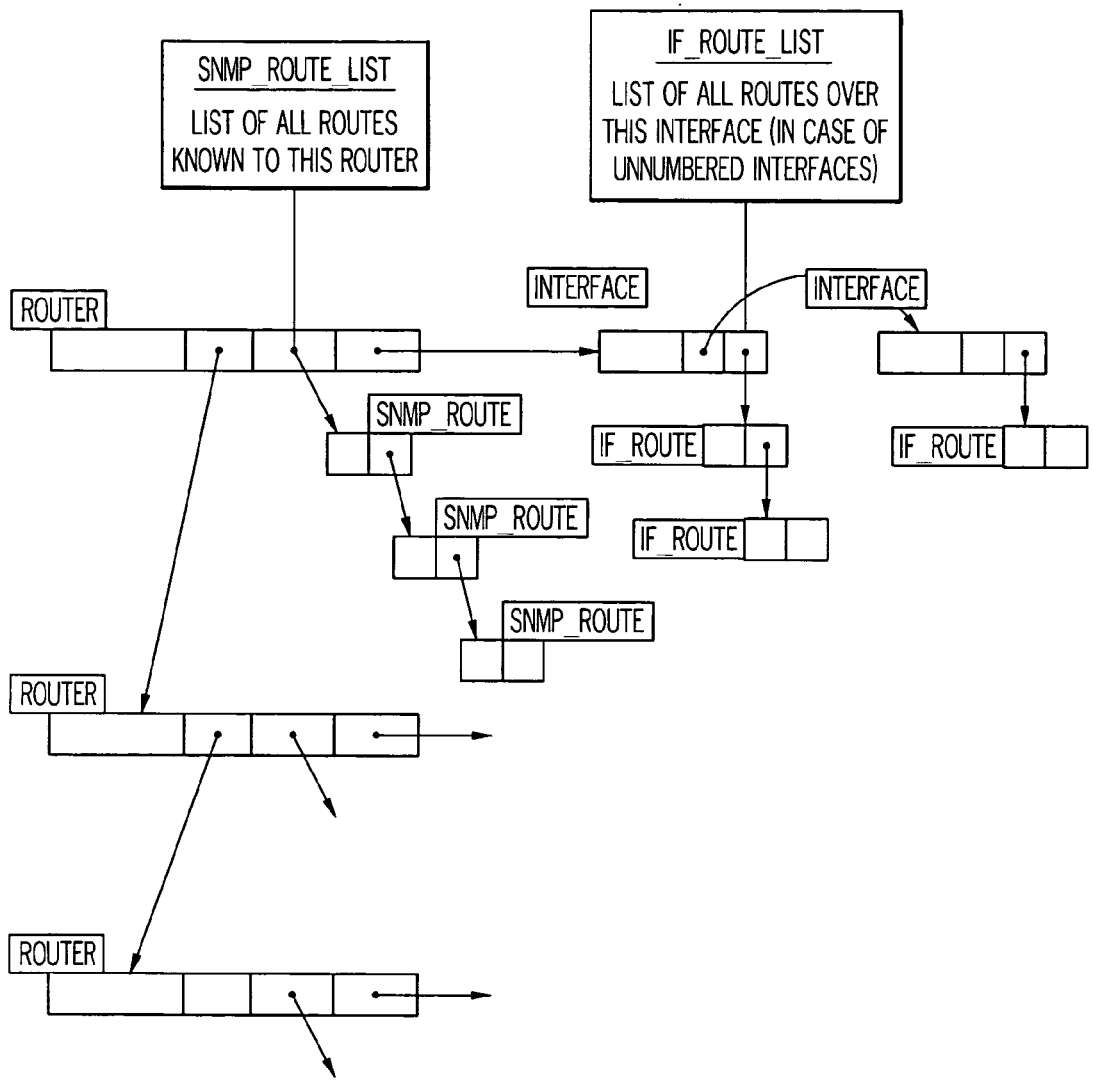
FIG. 6 is a data structure diagram depicting data structures that can be utilized to implement a method of identifying unnumbered interfaces, according to principles of the present invention.

The block diagram of FIG. 6 depicts an illustrative relationship between the above example data structures. These data structures, and the methods described herein, can be implemented via any of a variety of software programming languages, and can carry out the functions described herein as part of a network management software program stored in memory and executed by one or more processors on a computing device(s) which is connected to a computing network for discovery of the topology of that network. As can be understood, while these data structures are disclosed herein with specific names and architectures, the data structures and methods described herein can be implemented using a wide array of software and hardware techniques and architectures.

In addition to the above structures, a connectivity_node structure can be generated to represent an unnumbered connectivity (i.e., an unnumbered link) which is identified between two routers according to the methods described herein. It is this data structure that can then be provided to the network manager and/or used to generate a topology map indicating the identified connectivity:

```
connectivity_node
{
    router_one_ip;
    router_one_ifIndex;
    router_two_ip;
    router_two_ifIndex
    if_type;
    segment_name;
    flag_found;
    connectivity_node *next;
}
```

Figure 7A:
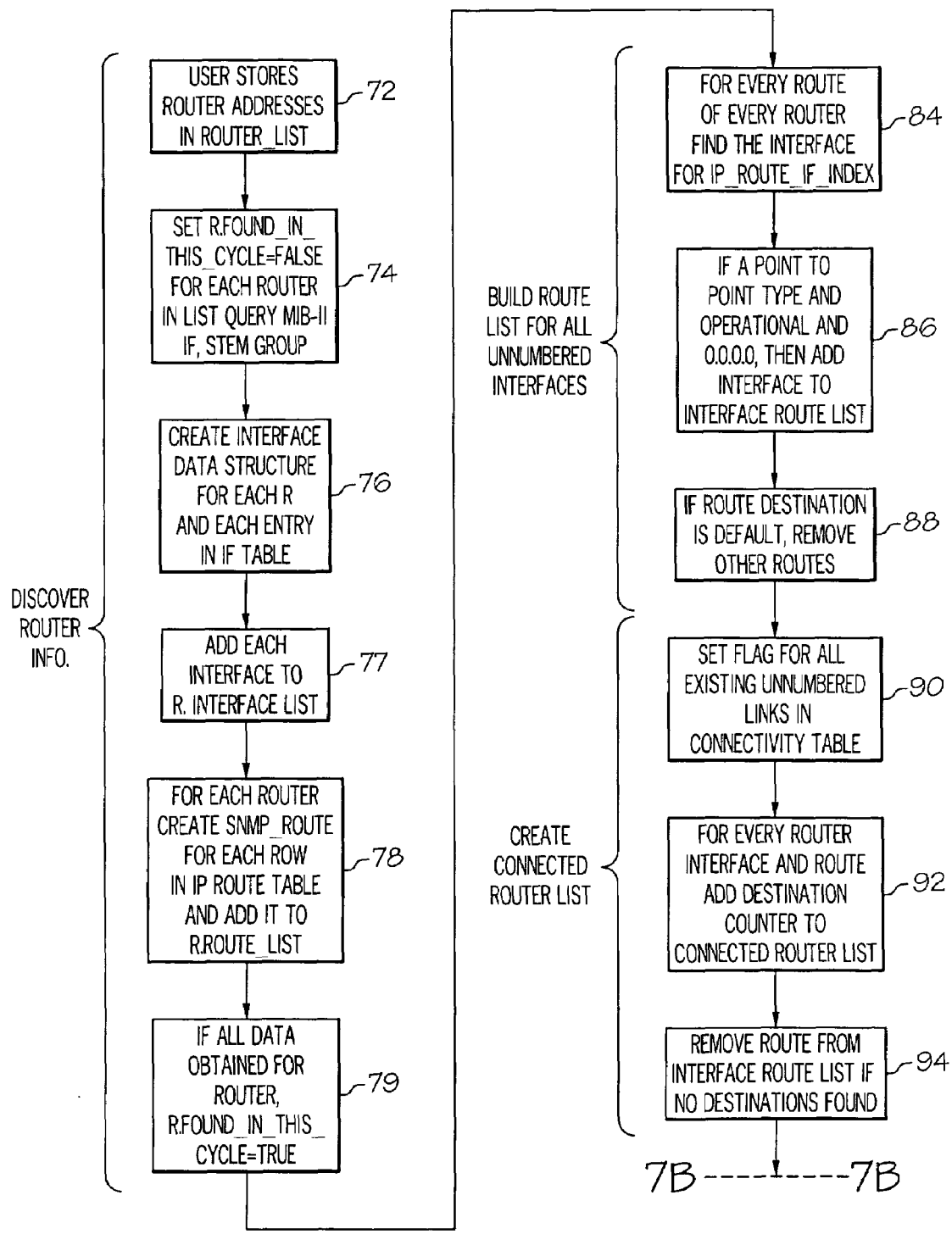
FIG. 7 is a flow chart depicting another example of a detailed method that can be used by a network management application to discover the routers in the network and identify unnumbered links, according to aspects of the present invention.
Figure 7B:
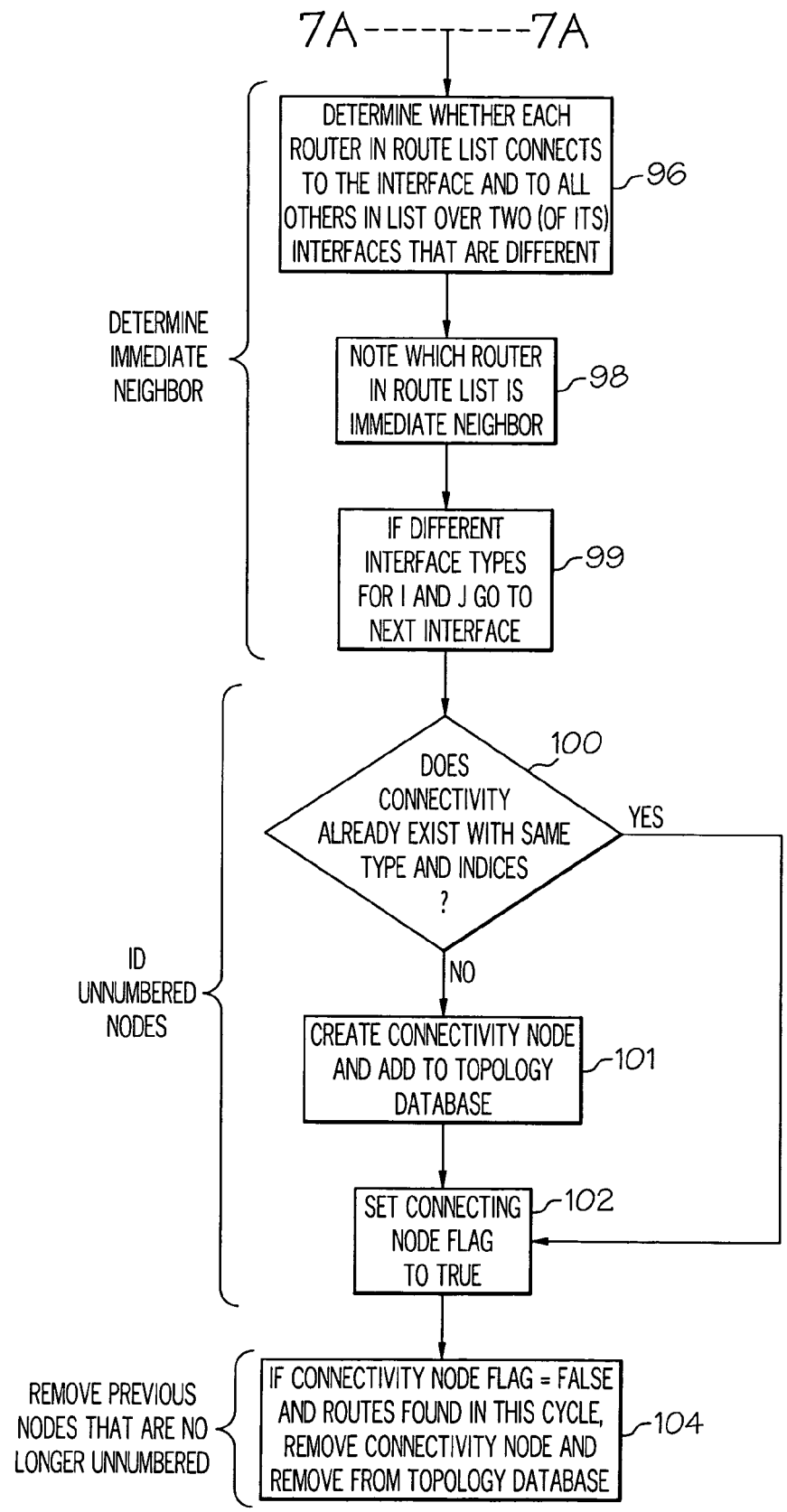

Moreover, for all unnumbered connectivity identified by the method, a list can be maintained to store all such locations found. For example, a list of all such unnumbered connectivity identified can be pointed to by a variable such as the one defined below. The network manager can also have access to this table and/or a topology can be generated therefrom:

connectivity_node*connectivity_jable;

FIG. 7 is a flow chart depicting another example of a method that can be used by a network management application to discover the routers in the network and identify unnumbered links, according to aspects of the present invention. This method can be repeated in every cycle of discovery. In this embodiment, MIB and SNMP data is utilized, although the principles of the method can be applied to other protocols now known or later developed.

As shown by steps 72-79 of the example of FIG. 7, in this embodiment, information regarding the routers in the network is first discovered. In particular, first, the addresses of the routers are provided by the user to a data structure, such as Router_List for example, as shown in block 72. In particular, in this embodiment, the user provides the address of the default gateway and addresses of all the routers that contain unnumbered links. In this embodiment, the method does not automatically discover the routers with unnumbered links as the router address may not be found in the ipRouteNextHop of ipRouteTable of any router. However, automated methods may be utilized in other embodiments.

Then, as shown by block 74, for every router R in the Router_List, the variable R.found_in_this_cycle is set to false and the MIB-II system group is queried, which contains the name of the system, its physical location, and the like, an example of which is shown in detail near the end of this description.

In addition, as shown at block 76, for each router R, the interface data structure is created for each entry in the ifTable. In particular, if an interface has an IP address bound to it, this information is updated in the Interface data structure. If an interface has more than one IP address bound, one copy of the Interface data structure is created for each IP address. Additionally, each Interface is added to R.interface_list, as shown in block 77.

Next, as shown in block 78, for each router R, an snmp_route is created for each row in ipRouteTable and added to R.route_list. If a valid address is found in ipRouteNextHop, this is added to the Router_List.

Then, as shown in block 79 if all information is successfully obtained, R.found_in_this_cycle is set to true if all the information. As also shown in this block, the router information in the topology database is updated. These operations are then repeated until the last router in the Router_List has been processed. The operations of blocks 72-79 can be depicted by the following pseudocode:

1.1. Add router addresses provided by the user to Router-List
1.2. For every router R in the Router_List
1.2.1 Set R.found_in_this_cycle=false
1.2.2 Query MIB-II system group
1.2.3 Query MIB-II ifTable and ipAddrTable
1.2.4 Query MIB-II ipRouteTable
1.2.5 Set R.found_in_this_cycle to true if all the information is successfully obtained
1.2.6 Update the router information in the topology database
1.2.6 Go to the next router in Router_List Then, as shown by blocks 84-88, a route list is built for all unnumbered interfaces that have been discovered in the previous steps of blocks 72-79. In particular, in these steps, for each unnumbered interface, the if_route_list is populated with the existing routes (to destination networks) over this unnumbered interface. Specifically, with respect to block 84, for every router R in the router list that was found, and for every route in R's route list, the method finds the interface in the interface list for the ip-route_if_index, which is the ifIndex value found in the route table that links or cross-references this route to an entry in the interface table. Then, if it is determined that the interface is a PPP or X.25 or frame relay type (a point to point type), and the interface is operational, and the interface has an IP address of 0.0.0.0., then the network route for the interface is added to the interface route list for the interface, as shown at block 86. However, if the route destination is a default route, then all other routes in the interface route list are removed and new routes are prohibited from being added, as shown in block 88. These steps of blocks 84-88 can also be represented by the following pseudocode:

2.1. For every router R in Router_List with
     R.found_in_this_cycle = true
  2.1.1. For every route in R.route_list
     - Find the Interface in R.interface_list for the
       ip_route_if_index
     - If(Interface.if_type = (PPP or X.25 or Frame Relay)
       AND Interface.operational_status = UP
       AND Interface.ip_address = 0.0.0.0)
       - Add ip_route_dest to Interface.if_route_list
       - If ip_route_dest = 0.0.0.0 (i.e. the default root)
       - Remove all other routes in if_route_list (routes
         already added)
       - Disallow new routes from being added to this
         if_route_list The next step in the example method of FIG. 7 is to mark the unnumbered connectivity discovered in a previous discovery cycle. This is done so that previously discovered unnumbered links can be removed from the data structures if they are not found in this cycle of discovery. This step is shown at block 90 and can be represented by the following:

3.1. Set connectivity_node.flag_found=false for all existing nodes in connectivity_table Steps 92-102 of FIG. 7 can then be utilized to build the connected router list, identify the immediate neighbor using the list, and create connectivity nodes in the topology database for every unnumbered link, according to principles of the present invention. In particular, in these steps, the connected router list for each unnumbered interface is populated with routers which are reachable through that interface. Among these routers, the router directly connected at the other end of the unnumbered link (the immediate neighbor) has the property of having routes to the router being examined and all other routers in the connected router list over two different interfaces. This property is used to identify the immediate neighbor. Then, if the immediate neighbor thus identified has a route back to the router being examined over an unnumbered interface, an unnumbered link has been identified.

In particular, at steps 92 and 94, for every router R that was entered in the router list, and for every interface I of R that was entered in the interface list, and for every entry in the interface route list for each interface: a) each destination router is added to the connected router list, and b) if no destination routers are found, then this route is removed from the interface route list. Then, the interfaces of the routers in the connected router list are examined to determine the immediate neighbor. In particular, as shown at blocks 96 and 98, for every router Ri in the connected router list and for every other router $R_j$ in the connected router list, it is determined whether Ri connects to R and to all other routers $R_j$ via two different interfaces. If so, then Ri is the immediate neighbor and this is noted. Then, as shown at blocks 99-102, it is determined if the immediate neighbor Ri has a route to one of R's networks or to a default route over an unnumbered interface J. In particular, as shown at block 99, If the interface type for interface I of the router R and the interface J are different, then the analysis is repeated with respect to the next interface. If it is determined at block 100 that there is a connectivity node between R and Ri with the same interface type and same interface indices, then the connectivity list (a running list of unnumbered connectivities or links) already includes this connectivity (it was discovered in a previous cycle). Thus, for this connectivity, only the connectivity node flag for that node needs to be set to true, thereby identifying the node as shown by block 102. Otherwise, as shown by block 101, a connectivity node data structure needs to be created for the node and the unnumbered connectivity is added to the topology database, such that it will be identified by the network manager, who accesses that database or views a topology created therefrom. The connectivity node flag is also set to true in this case as well.

These steps can be represented by the following pseudocode:

| | |
|---|---|
| 4.1. | For every router R in Router_List with R.found_in_this_cycle = true |
| 4.2. | For every interface I in R.interface_list |
| 4.2.1 | For every entry in if_route_list |
| | – Add routers on ip_route_dest to connected_router_list if that router is found in this cycle. Each node of connected_router_list will contain pointers to the actual router. A new router is added only if it does not exist. |
| | – If no routers are found on ip_route_dest, remove this route from if_route_list |
| 4.2.3 | For every router $R_i$ in connected_router_list |
| | – For every $R_j$ in connected_router_list (other than $R_i$) |
| | – If isIntermediateRouter($R_i$, R, $R_j$) = TRUE for all $R_j$ $R_i$ is the immediate neighbor |
| | – If $R_i$ (the immediate neighbor) has a route to one of R's networks or contains a default route over an unnumbered interface J |
| | – If ifType of the interface I of R and interface J of $R_i$ are different, go to next interface (Step 4.2) |
| | – Find a connectivity_node between R an $R_i$ (Any IP Address) with same ifType and ifIndeces |
| | – If a node is found, set connectivity_node.flag_found = true |
| | – Else create a connectivity_node with flag_found = true. Add the unnumbered connectivity to the topology database |

Finally, as shown by block 104, links are removed from the connectivity table if those links were not discovered in this cycle. In particular, if the connectivity table contains a link between two routers discovered in a previous cycle but not in this cycle, and if the two routers have been discovered successfully in this cycle, the unnumbered connectivity is deleted. The connectivity is not deleted if one of the routers is not discovered in this cycle. In particular, as shown at block 104, for every connectivity node in the connectivity table, if the flag for the node is false, the two routers for the node are accessed from the router list. Then if the flag indicating that the router was found in this present cycle is true for both routers, the corresponding connectivity node for the routers is removed from the connectivity table, and the unnumbered connectivity node is removed from the topology database, as shown at block 104. In other words, that unnumbered node was not found in the present cycle of the discovery method and therefore that node should no longer be indicated as being unavailable (i.e., it is either now numbered or is no longer a current link). These steps can be represented by the following pseudocode:

5.1 For every connectivity_node in connectivity_jable 5.2 If connectivity_node.flag_found=false 5.3.1 Find the two routers in RouterList 5.3.2 If Router.found_in_this_cycle=true for both the routers Remove the connectivity_node from the connectivity_table Remove the unnumbered connectivity from the topology database Although various protocols could be implemented with the above example embodiments, the embodiments can be applied to SNMP protocol. The following table is a summary of the SNMP information that can be used by the router discovery method discussed above in order to carry out the inventive unnumbered link discovery techniques.

| Protocol | Object Identifier | What is Discovered |
|---|---|---|
| SNMP - System group | | System information. |
| sysDescr | 1.3.6.1.2.1.1.1 | |
| sysName | 1.3.6.1.2.1.1.5 | |
| sysContact | 1.3.6.1.2.1.1.4 | |
| sysLocation | 1.3.6.1.2.1.1.6 | |
| ifNumber | 1.3.6.1.2.1.2.1 | Information about each interface on the router |
| SNMP - ifTable | | |
| ifIndex | 1.3.6.1.2.1.2.2.1.1 | |
| ifDescr | 1.3.6.1.2.1.2.2.1.2 | |
| ifType | 1.3.6.1.2.1.2.2.1.3 | |
| ifPhysAddress | 1.3.6.1.2.1.2.2.1.6 | |
| ifOperStatus | 1.3.6.1.2.1.2.2.1.8 | |
| ipForwarding | 1.3.6.1.2.1.4.1 | IP to MAC bindings for this host. |

-continued

| Protocol | Object Identifier | What is Discovered |
| --- | --- | --- |
| SNMP - ipAddrTable | | The value of ipForwarding decides whether IP routing is enabled on this device. |
| ipAdEntAddr | 1.3.6.1.2.1.4.20.1.1 | |
| ipAdEntIfIndex | 1.3.6.1.2.1.4.20.1.2 | ipAdEntIfIndex is the ifIndex value of the interface in ifTable to which this IP Address is bound |
| ipAdEntNetMask | 1.3.6.1.2.1.4.20.1.3 | |
| SNMP - ipRouteTable | | The routes known to this router |
| ipRouteDest | 1.3.6.1.2.1.4.21.1.1 | ipRouteDest is the destination network. An address of 0.0.0.0 denotes the default route. ipRouteIfIndex is the ifIndex value of the interface in ifTable over which the route exists to the destination network. |
| ipRouteIfIndex | 1.3.6.1.2.1.4.21.1.2 | |
| ipRouteNextHop | 1.3.6.1.2.1.4.21.1.7 | |
| ipRouteType | 1.3.6.1.2.1.4.21.1.8 | |

Figure 8:
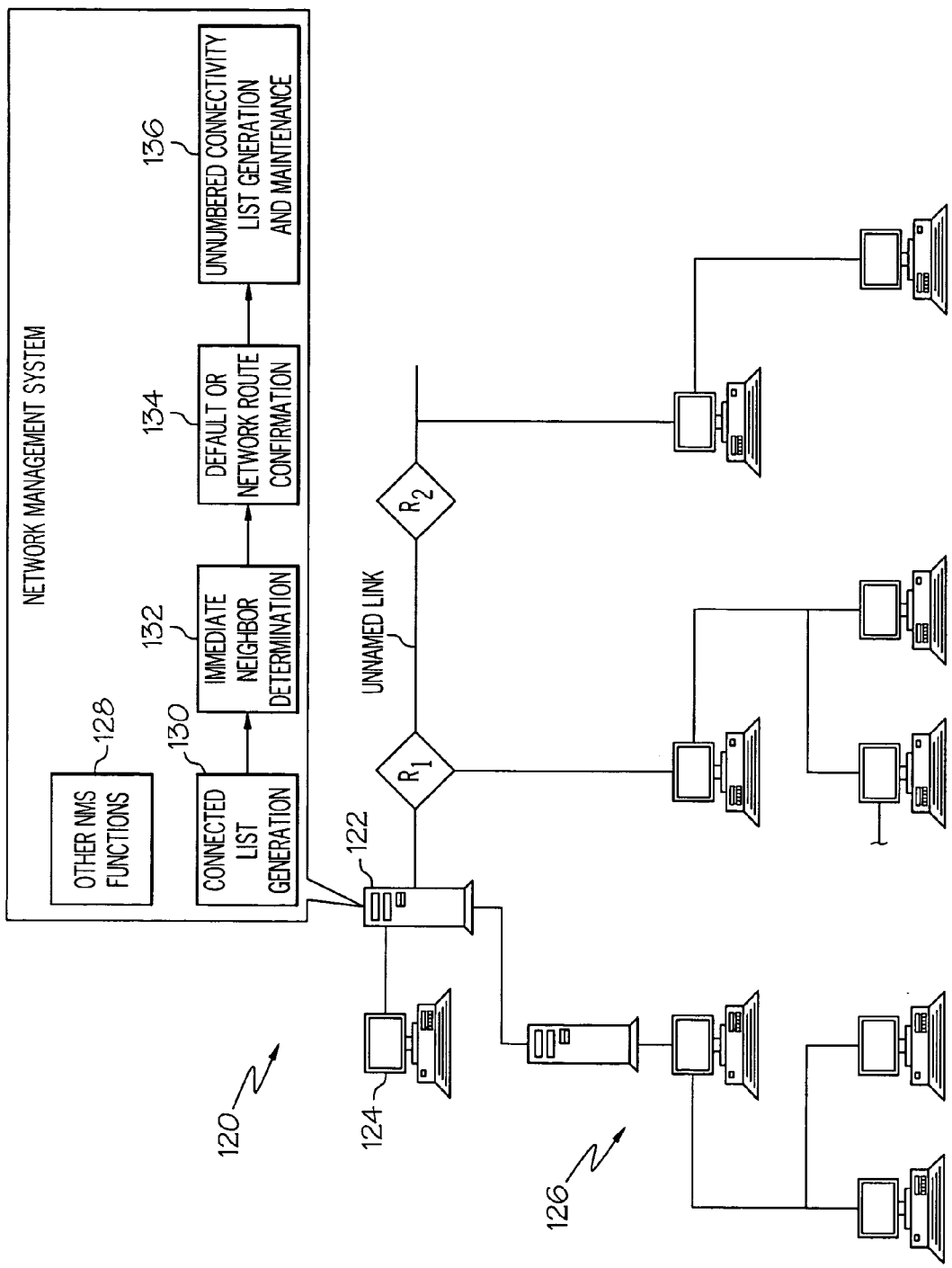
FIG. 8 is a schematic diagram of a network including a network management system that operates in accordance with principles of the present invention.

FIG. 8 is a schematic diagram illustrating an example of a system where the methods described above could be executed. In particular, in this example, the network management system 120 includes software executed by network managing server 122, which can be controlled by a network manager via a management console 124, for controlling, configuring and monitoring network 126. The network management system 120 can include standard network software modules or functions 128, as well as modules that operate according to principles of the present invention, such as those which operate according to the example methods described. In this example, the system includes a connected list generation module 130 for identifying unnumbered interfaces and determining routers connected to unnumbered interfaces, an immediate neighbor determination module 132 for determining the immediate neighbor to an unnumbered interface based upon properties of the connected routers, a default/network route confirmation module 134 for confirming connection of the immediate neighbor to the unnumbered interface, and an unnumbered connectivity list generation and maintenance module for maintaining identifiers of the unnumbered links. These links, such as the unnumbered link between R1 and R2, can then be identified to a network manager who is using the system 120 to discover network topology.

The above illustrative embodiments depicting various aspects of the invention can be utilized with a wide variety of applications, protocols, data configurations, network architectures, and addressing schemes. For example, although reference has been made to routers and SNMP protocol, the methods have application to a variety of network devices and a variety of network protocols. Moreover, as can be understood, the methods, systems and functions described herein can be implemented in computer executable instructions, routines, sections of code, software components, programs, or the like, which operate via one or more processors, controllers, computational devices, or appropriate hardware components. Any of a variety of software or programming languages can be utilized for this purpose. Moreover, the data and programmed methods referred to herein may be stored on any suitable storage medium, such as on hard disk drives, CD-ROM drives, backup storage devices, or other memory devices, such as suitable non-volatile optical, magnetic, or electronic memory devices. Furthermore, a variety of suitable types of computing devices could be utilized to implement the methods and systems described herein, including computers, data processors, or other devices having appropriate circuitry or hardware connected in an appropriate manner for use for the described functions. Accordingly, the foregoing description of the illustrative embodiments has been presented for purposes of illustration and description of the various principles of the inventions. It is not intended to be exhaustive or to limit the inventions to the precise forms disclosed, and modifications and variations are possible in light of the above teachings. For example, although a number of methods, systems, operations, and configurations have been described in the illustrative embodiments, it is to be understood that additional or alternative methods, systems, orders of operation and configurations could be used without departing from the scope of the inventions. Moreover, although various aspects of the inventions have been illustrated, these aspects need not be utilized in combination. Likewise, the principles of the present invention are applicable to a number of routing devices, including routers, switches, computers, and gateways, as well as other network devices.

Therefore, it should be understood that the embodiments were chosen and described merely in order to best illustrate the principles of the inventions and some examples of possible practical applications. This illustration was also provided to thereby enable one of ordinary skill in the art to utilize the aspects of the inventions in various embodiments and with various modifications as are suited for the particular use contemplated. Accordingly, it is intended that the scope of the inventions be defined by the claims appended hereto.

What is claimed is:

1. A method for discovery of network topology in networks having network routers with unnumbered interfaces connecting to next-hop routers having an assigned unknown destination network number, the method comprising:
   obtaining a configuration of every routers in a network;
   for a particular router of the every router in the network identifying an unnumbered interface;
   for the unnumbered interface of the particular router, identifying all connected routers reachable through the unnumbered interface including the next-hop routers and routers connected beyond the next-hop routers and adding said all connected routers to a connected router list for the unnumbered interface, wherein at least one of the next-hop routers and one of the routers connected beyond the next-hop routers has the assigned unknown destination network number;
   for the all connected routers in the connected router list, determining which of the all connected routers is an immediate neighbor to the particular router having the unnumbered interface;
   determining a connected interface of the immediate neighbor which connects to the unnumbered interface of the particular router;

identifying an unnumbered link between the unnumbered interface and the connected interface; and repeating the identifying an unnumbered interface and identifying all connected routers for each of the every router in the network.

2. The method as recited in claim 1, wherein the determining which of the all connected routers is the immediate neighbor further includes checking for an intermediate router in the connected router list between the particular router and the immediate neighbor.

3. The method as recited in claim 2, wherein the checking further includes determining whether the immediate neighbor connects to the unnumbered interface and to the routers connected beyond the next-hop routers over different interfaces.

4. The method as recited in claim 2, wherein the checking further includes utilizing values in a route table having an interface index and a route destination.

5. The method as recited in claim 1, further comprising:
confirming that the immediate neighbor connects to the unnumbered interface via a network route or a default route over an unnumbered interface.

6. The method as recited in claim 1, further comprising:
storing the unnumbered link in a connectivity list; and periodically updating the connectivity list.

7. The method as recited in claim 6, wherein the connectivity list is periodically updated by repeating determining whether the unnumbered link is identified in a current or a previous cycle.

8. A method for automated discovery of network topology in networks having network routing devices with unnumbered interfaces connecting to next-hop routers with an assigned unknown destination network number, the method comprising:

for a routing device in a network, identifying an unnumbered interface of the routing device;

identifying connected routing devices connected to the unnumbered interface including the next-hop routers and routers connected beyond the next-hop routers, at least one of the next-hop routers and one of the routers connected beyond the next-hop routers having the assigned unknown destination network number;

determining which of the connected routing devices is an immediate neighbor to the routing device having the unnumbered interface;

identifying an unnumbered link between the unnumbered interface and a corresponding interface of the immediate neighbor; and indicating the unnumbered link in network topology data.

9. The method as recited in claim 8, wherein the operation of deter g the immediate neighbor is conducted by determining which connected routing device connects to the unnumbered interface and to all other connected routing devices over different interfaces.

10. The method as recited in claim 9, wherein the determining operation utilizes values in a route table for each connected router, the values comprising an interface index and a route destination.

11. The method as recited in claim 8, further comprising:
confirming that the immediate neighbor connects to the unnumbered interface via a network route or a default route.

12. A method for automated discovery of network topology in networks having network routing devices with unnumbered links, the method comprising:

identifying an unnumbered interface of a routing device in a network;

using route data of a connected router list to identify connected routing devices connected to the unnumbered interface including identifying next-hop routers and routers connected beyond the next-hop routers, wherein at least one of the next-hop routers and one of the routers connected beyond the next-hop routers has an assigned unknown destination network number;

for the next-hop routers and the routers connected beyond the next-hop routers identifying all connected routing devices and adding the all connected routing devices to the connected router list;

for every of the connected routing devices and the all connected routing devices of the connected router list, comparing interface connections; and using the compared interface connections to identify an unnumbered link between the unnumbered interface and a corresponding interface of one of the connected routing devices, the one of the connected routing devices being an immediate neighbor listed on the connected router list as one of the next-hop routers.

13. The method as recited in claim 12, wherein the comparing utilizes route destination and corresponding interface data.

14. A computer network, comprising:

at least two network devices connected to one another in a next-hop configuration, one device having an unnumbered interface connected to an unnumbered interface of the other device thereby defining a link that is unnumbered, wherein the one device and the other device each has an assigned unknown destination network number corresponding to the other device and the one device, respectively;

network management information data on a connected router list indicating interface assignments of the two network devices; and a network management system configured to access the network management information data on the connected router list, to confirm that the network devices are immediate neighbors and connect to one another via unnumbered interfaces, to assign an identifier of the unnumbered link, and to present that identifier in network topology data, wherein the confirmation that the network devices are said immediate neighbors and connect to one another further includes configuration of the network management system to examine the connected router list and compare each said interface assignment of the two network devices and determine whether the other device connects to the one device over a different interface assignment or the other device connects to still another network device having the assigned unknown destination network number.

15. The network as recited in claim 14, wherein the two network devices comprise routing devices.

16. The network as recited in claim 15, wherein the routing devices comprise routers.

* * * * *

UNITED STATES PATENT AND TRADEMARK OFFICE
CERTIFICATE OF CORRECTION

PATENT NO. : 7,292,541 B1  Page 1 of 1
APPLICATION NO. : 10/766715
DATED : November 6, 2007
INVENTOR(S) : C S It is certified that error appears in the above-identified patent and that said Letters Patent is hereby corrected as shown below:

Column 18, Claim 1, line 49, change "routers" to --router--.

Column 19, Claim 9, line 51, change "deter g" to --determining--.

Signed and Sealed this

Eleventh Day of March, 2008

JON W. DUDAS
*Director of the United States Patent and Trademark Office*